United States Patent
Liu et al.

(10) Patent No.: US 12,314,051 B2
(45) Date of Patent: May 27, 2025

(54) METHOD FOR NAVIGATING ROOT THROUGH LIMITED SPACE, ROBOT AND COMPUTER-READABLE STORAGE MEDIUM

(71) Applicant: UBTECH ROBOTICS CORP LTD, Shenzhen (CN)

(72) Inventors: Dunhao Liu, Shenzhen (CN); Youjun Xiong, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 223 days.

(21) Appl. No.: 18/079,807

(22) Filed: Dec. 12, 2022

(65) Prior Publication Data

US 2023/0266763 A1    Aug. 24, 2023

(30) Foreign Application Priority Data

Feb. 24, 2022   (CN) .......................... 202210177915.4

(51) Int. Cl.
  G05D 1/00   (2024.01)
  G01C 21/20  (2006.01)

(52) U.S. Cl.
  CPC ........... *G05D 1/0214* (2013.01); *G01C 21/20* (2013.01)

(58) Field of Classification Search
  CPC ............................. G05D 1/0214; G01C 21/20
  USPC ......................................................... 701/26
  See application file for complete search history.

(56) References Cited

U.S. PATENT DOCUMENTS

| | | | | |
|---|---|---|---|---|
| 12,092,467 | B1* | 9/2024 | Ebrahimi Afrouzi | G01C 21/32 |
| 2018/0058861 | A1* | 3/2018 | Doria | G01S 7/4808 |
| 2019/0337154 | A1* | 11/2019 | Holson | B25J 9/1697 |
| 2021/0089040 | A1* | 3/2021 | Ebrahimi Afrouzi | G05D 1/0248 |

FOREIGN PATENT DOCUMENTS

| | | | | |
|---|---|---|---|---|
| CN | 104460666 A | * | 3/2015 | |
| CN | 111761581 A | * | 10/2020 | ............... B25J 9/16 |
| CN | 112947309 A | * | 6/2021 | ......... G05B 19/4103 |
| CN | 113340311 A | * | 9/2021 | |

* cited by examiner

*Primary Examiner* — Joseph M Rocca
*Assistant Examiner* — Ahmed Alkirsh

(57) ABSTRACT

A method for navigating a robot through a limited space includes: obtaining a planned first path for the robot to reach a target position; calculating curvature and/or normal vectors of points in the first path; according to the curvature and a preset curvature threshold, and/or according to the normal vectors and a preset normal vector change threshold, obtaining a first straight path for the robot outside the limited space by curve fitting; determining an intersection of a centerline of the limited space and the first straight path, and determining a second straight path for the robot to move through the limited space according to the centerline and the intersection; and generating a second path for the robot to move through the limited space based on the first straight path and the second straight path, and navigating the robot to move through the limited space according to the second path.

20 Claims, 9 Drawing Sheets

METHOD FOR NAVIGATING ROOT THROUGH LIMITED SPACE, ROBOT AND COMPUTER-READABLE STORAGE MEDIUM

CROSS REFERENCE TO RELATED APPLICATIONS

This application claims priority to Chinese Patent Application No. CN 202210177915.4, filed Feb. 24, 2022, which is hereby incorporated by reference herein as if set forth in its entirety.

BACKGROUND

1. Technical Field

The present disclosure generally relates to robots, and particularly to a method for navigating a robot through a limited space, a robot, and a computer-readable storage medium.

2. Description of Related Art

Service robots have been employed in many fields, such as tour guide robots used in shopping malls, inspection robots used in parks, food delivery robots used in the catering industry, and delivery service robots used in nursing homes. Different scenarios put forward different requirements for the robot's navigation ability, especially some delivery robots, which require the robots to reach the designated room to complete the delivery task.

However, in certain circumstances, it may be difficult for a robot to pass through a limited space when performing the delivery task. For example, the width of the doors of some rooms are only slightly greater than the width of the robot. Due to sensor noise, robot positioning errors, and the optimality of the global trajectory, it will be difficult for the robot to pass through the doors, and collisions are likely to occur.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
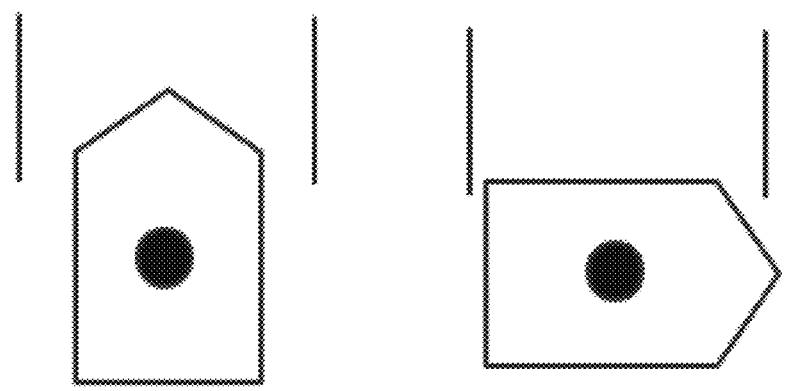
FIG. 1 is a schematic diagram of a mobile robot passing through a narrow space in different poses according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The current global path planning approaches, including A* path planning algorithm, Dijkstra path planning algorithm, etc., usually do not consider the specific planning scene and the shape and pose of robots. A robot is considered as a particle, and obstacles in the map are expanded. However, in fact, robots have a certain size and are not necessarily regular shapes. When the shape of a mobile robot (e.g., a wheeled robot) is as shown in FIG. 1, if the robot moves in the pose on the left side of FIG. 1, it can safely pass through the narrow space (e.g., a door). When the robot moves in the pose on the right side of FIG. 1, the robot cannot pass through the narrow space.

Figure 2:
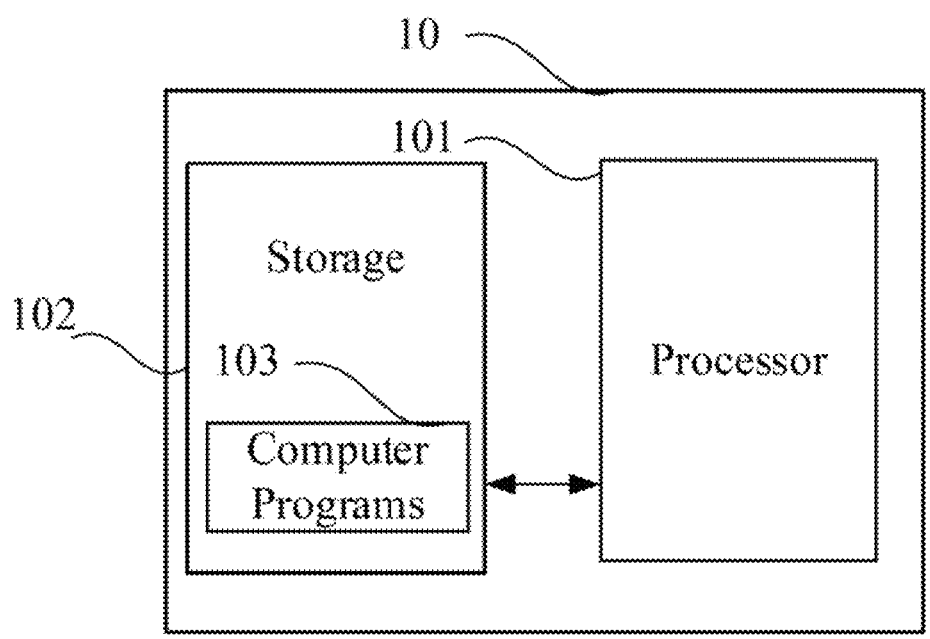
FIG. 2 is a schematic block diagram of a mobile robot according to one embodiment.
Figure 5:
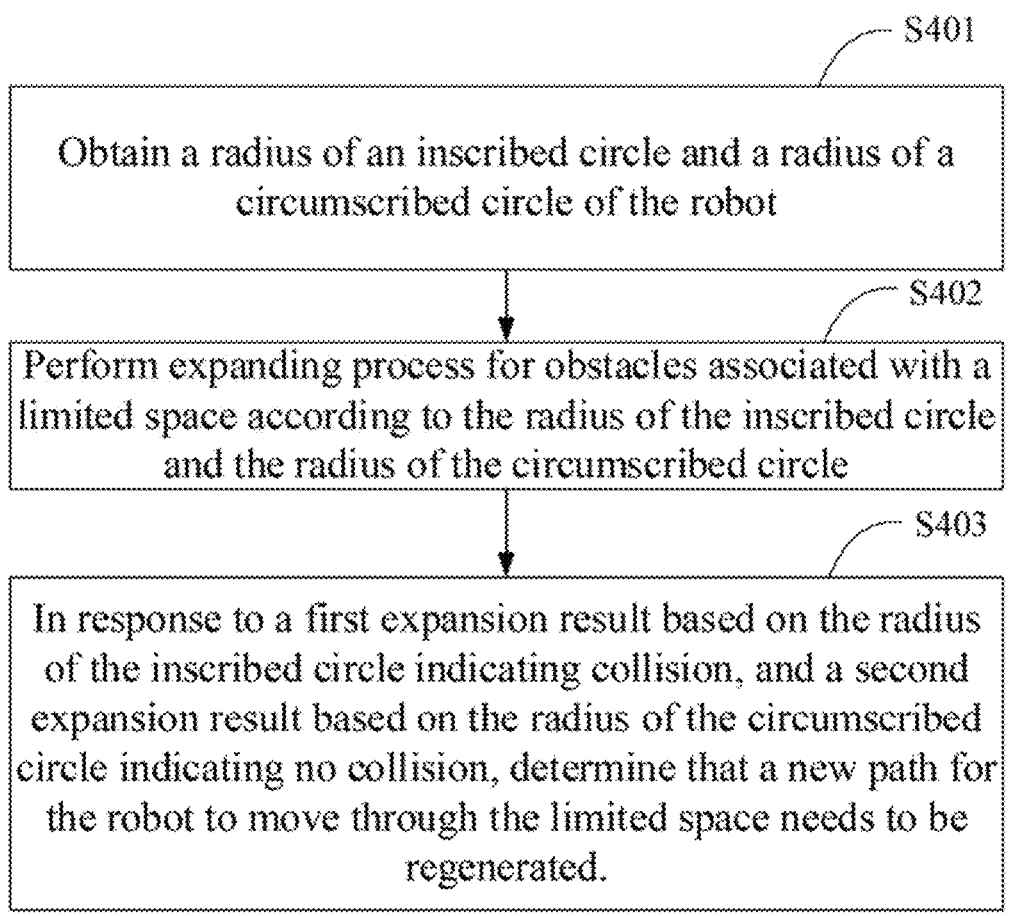
FIG. 5 is an exemplary flowchart of a method for determining whether to use an optimized second path for navigation according to one embodiment.

FIG. 2 shows a schematic block diagram of a robot 10 (e.g., an autonomous mobile robot) according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, the storage 102 and the processor 101 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 10, such as steps S201 to S205 in FIG. 3 and steps S401 to S403 in FIG. 5 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 10, such as a hard disk or a memory. The storage 102 may also be an external storage device of the robot 10, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot 10. The storage 102 can also be used to temporarily store data that have been output or is about to be output.

Figure 9:
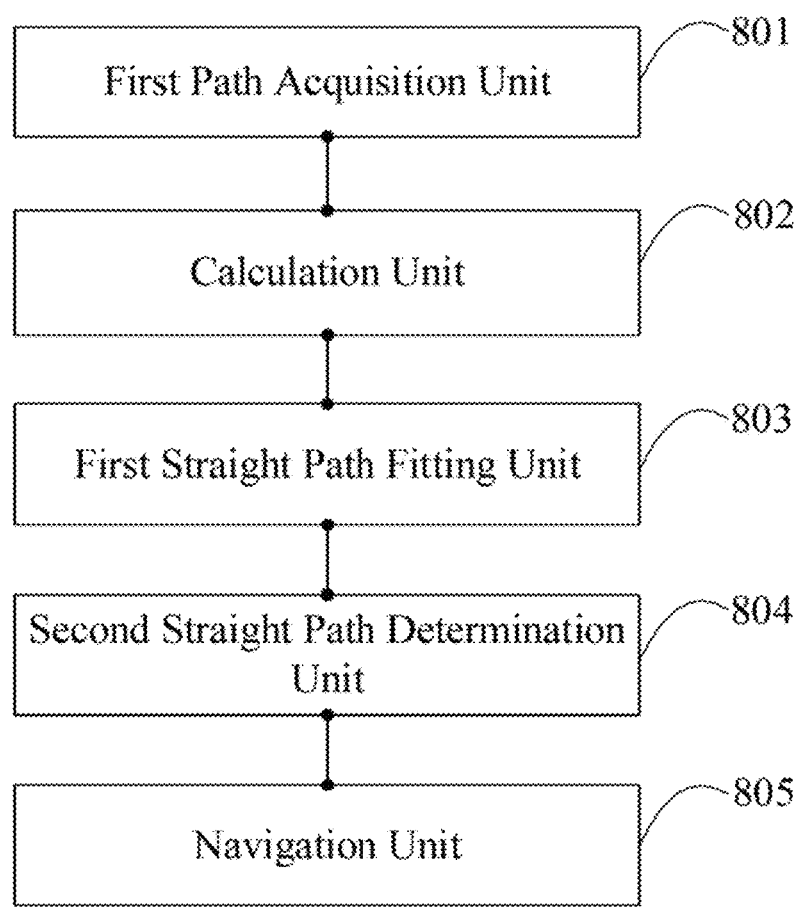
FIG. 9 is a schematic block diagram of a navigation device for a robot according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 10. For example, the one or more computer programs 103 may be divided into a first path acquisition unit 801, a calculation unit 802, a first straight path fitting unit 803, a second straight path determination unit 804, and a navigation unit 805 as shown in FIG. 9.

It should be noted that FIG. 2 is only an example of the robot 10, and does not constitute a limitation to the robot 10. It may include more or less components than those shown in the figure, or include a combination of certain components, or different components. For example, the robot may also include input and output devices, network access devices, buses, and the like.

Figure 3:
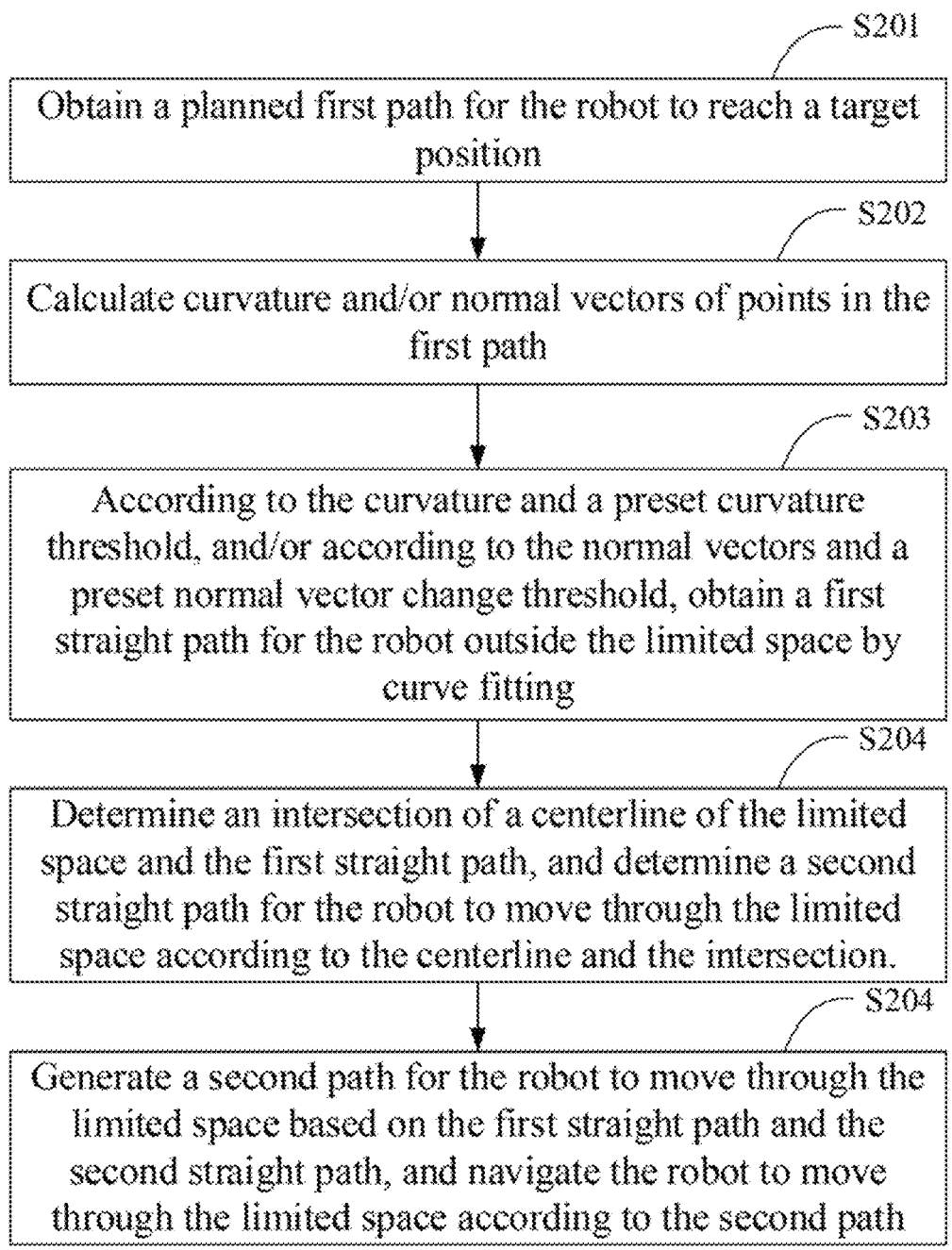
FIG. 3 is an exemplary flowchart of a navigation method for a robot according to one embodiment.

In order to improve the reliability of the robot passing through a narrow space and reduce the probability of collision when the robot passes through the narrow space, an embodiment of the present disclosure proposes a method for the navigating the robot, as shown in FIG. 3. In one embodiment, the method may include the following steps.

Step S201: Obtain a planned first path for the robot to reach a target position.

Figure 4:
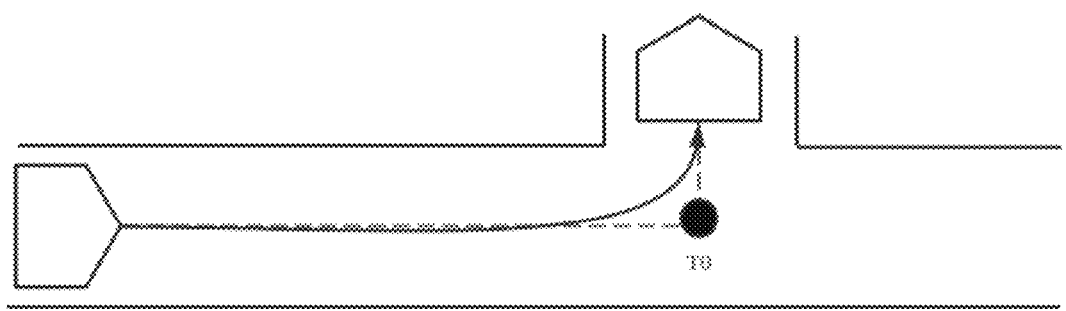
FIG. 4 is a schematic diagram of path optimization for a robot passing through a narrow space according to one embodiment.

In one embodiment, the first path may be a path generated by a shortest path algorithm. For example, the A* path planning algorithm or the Dijkstra path planning algorithm may be used to generate the shortest path as the first path. The dotted line shown in FIG. 4 is a schematic diagram of the first path generated by using the shortest path algorithm. Since the generation of the first path only considers factors such as the shortest length of the path, when the robot moves along the first path and passes through a narrow space such as a door, the robot may collide with the obstacles (e.g., walls) associated with the narrow space if the pose of the robot fails to effectively adapt to the position of the obstacles, or the position of the robot is too close to the obstacles. Therefore, it is necessary to further optimize the first path to improve the safety and reliability of the robot when passing through a narrow space.

In a possible implementation, it may be further determined whether the scenario needs to adopt an optimized second path. The steps of determining whether the optimized second path needs to be adopted can be shown in FIG. 5.

Step S401: Obtain a radius of an inscribed circle and a radius of a circumscribed circle of the robot.

Figure 6:
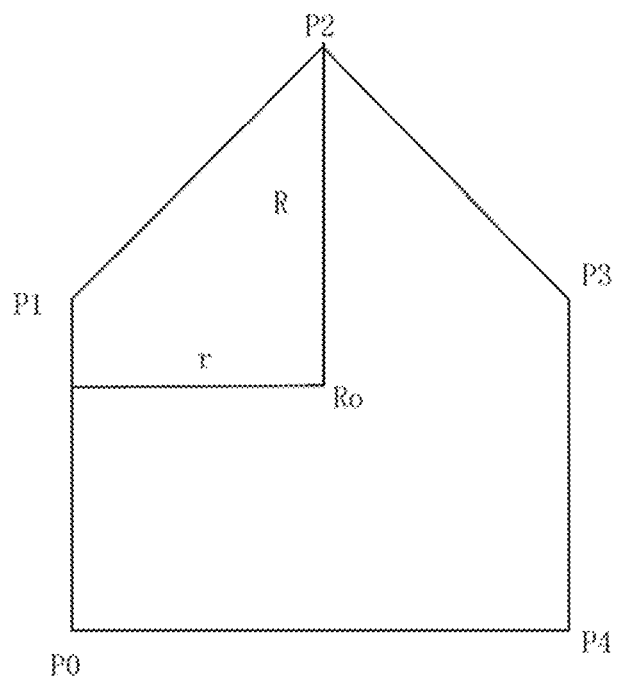
FIG. 6 is a schematic diagram of a robot based on which the radius of the inscribed circle and the radius of the circumscribed circle of the robot can be determined.

Assuming that the robot's chassis is shown in FIG. 6, the coordinates of the center Ro of the robot are (x, y), and the vertices on the contour of the robot's chassis include {p0(x0, y0), p1(x1, y1), p2(x2, y2), p3(x3, y3), p4(x4, y4)}. The distance from the center of the robot to each side of the contour of the robot chassis is calculated, and the smallest distance is selected as the radius of the inscribed circle of the robot. The largest distance from the center of the robot to one of the vertices on the contour of the robot's chassis is selected as the radius of the circumcircle of the robot.

In another embodiment, the radius of the inscribed circle and the radius of the circumscribed circle of the robot can also be determined by the maximum cross-sectional width. For example, the cross-sectional width of the robot may be calculated when the robot is in any pose. The smallest cross-sectional width is used as the diameter of the inscribed circle, and the largest cross-sectional width is used as the diameter of the circumscribed circle. The radius of the inscribed circle and the radius of the circumscribed circle of the robot can then be determined.

Step S402: Perform obstacle expanding for obstacles associated with a limited space according to the radius of the inscribed circle and the radius of the circumscribed circle.

After the radius of the inscribed circle and the radius of the circumscribed circle of the robot are determined, an expanding process for obstacles associated with the limited space can be performed according to the radius of the inscribed circle and the radius of the circumscribed circle. The radius of the inscribed circle is smaller than the radius of the circumscribed circle. After the expanding process, the expansion area formed based on the radius of the inscribed circle and the expansion area formed based on the radius of the circumscribed circle can be obtained. The expansion area formed based on the radius of the circumscribed circle is greater than the expansion area formed based on the radius of the inscribed circle, and the expansion area formed based on the radius of the circumscribed circle includes the expansion area formed based on the radius of the inscribed circle.

Figure 7:
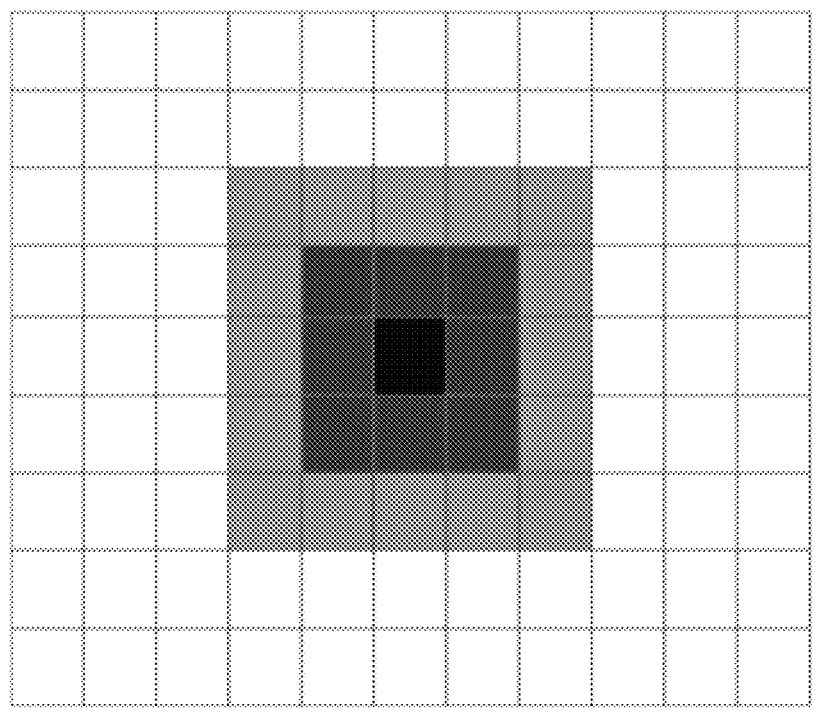
FIG. 7 is a schematic diagram of different areas after obstacle expansion according to one embodiment.

As shown in FIG. 7, in one example, the black area represents an obstacle area, and the white area represents a free area. Assuming that the radius of the inscribed circle is 1 and the radius of the circumscribed circle is 2, the dark gray area within one pixel around the obstacle is the expansion area formed based on the radius of the inscribed circle, and the light gray area within two pixels around the obstacle is the expansion area formed based on the radius of the circumscribed circle.

Step S403: In response to a first expansion result based on the radius of the inscribed circle indicating collision, and a second expansion result based on the radius of the circumscribed circle indicating no collision, determine that a new path for the robot to move through the limited space needs to be regenerated.

After the expanding process based on the radius of the inscribed circle and the radius of the circumscribed circle, the information associated with the narrow space can be obtained. If the expansion result based on the radius of the inscribed circle indicates collision, it means that even if the pose of the robot is adjusted, it cannot pass through the narrow space. If the expansion result based on the radius of the inscribed circle indicates no collision, and the expansion result based on the radius of the circumscribed circle indicates collision, it means that the robot may pass through the narrow space by adjusting the pose of the robot and path. If the expansion results based on the radius of the inscribed circle and the radius of the circumscribed circle indicate no collision, it means that the robot can pass through the narrow space in its current pose.

It should be noted that if the expansion result based on the radius of the circumscribed circle indicates no collision and the space that allows the robot to pass through is relatively small, it may still collide with obstacles when the robot passes through the space. In this case, the pose of the robot can be further adjusted so that the cross-sectional width of the robot in the forward direction is adjusted to a smaller value or a minimum value, thereby reducing the probability of the robot colliding with obstacles during the movement process.

Step S202: Calculate curvature and/or normal vectors of points in the first path.

After the shortest first path for the robot to pass through the narrow space is determined by an approach such as the shortest path method, sampling can be performed from the first path, and the curvature and/or normal vectors of the sampled points can be calculated. In one embodiment, sampling can be performed according to the rule of equal spacing. For example, the points in the first path obtained by sampling may include {p0(x0,y0), p1(x1,y1), . . . pn(xn,yn)}.

When calculating the curvature and normal vector of each point, the adjacent path points in the range that is created by taking the point to be calculated as the center and has a predetermined radius can be obtained. The curvature r and the normal vectors v are calculated based on the determined adjacent path points, and the calculation equation is as follows:

$$r = r2/(r1 + r2); v = \begin{bmatrix} U(0, 1) \\ U(1, 1) \end{bmatrix},$$

where $$r1 \text{ and } r2 \text{ satisfy } U, \begin{bmatrix} r1 & 0 \\ 0 & r2 \end{bmatrix},$$

$U^T = \text{svd}(A)$, $$A = \frac{1}{|\text{neighbors}|} \sum_{p_i \in \text{neighbors}} (p_i - \overline{p})^T (p_i - \overline{p}),$$

and $$\overline{p} = \frac{1}{|\text{neighbors}|} \sum_{p_i \in \text{neighbors}} p_i,$$

pi represents any adjacent path point. U represents an orthogonal matrix obtained by singular value decomposition, A represents a 2*2 matrix calculated by a formula, and $\overline{p}$ represents the mean value of all adjacent points.

Step S203: According to the curvature and a preset curvature threshold, and/or according to the normal vectors and a preset normal vector change threshold, obtain a first straight path for the robot outside the limited space by curve fitting.

After the curvature and/or normal vectors of the points in the first path are determined, the first straight path may be determined based on the curvature. Alternatively, the first straight path may be determined based on the normal vectors. Alternatively, the first straight path may be determined based on the curvature and the normal vectors.

When determining the first straight path based on the curvature, the curvature of the points in the path may be compared with a preset curvature threshold. The first straight path can then be obtained by fitting points that are located outside the narrow space and whose curvature is less than the preset curvature threshold.

The points outside the narrow space can be local paths located near the narrow space. That is, after the first path is generated using the shortest path method, a partial path of the first path can be selected, and the points in the selected partial path that are located outside the narrow space and whose curvature is smaller than the preset curvature threshold are fitted to obtain the first straight path.

When the first straight path is determined based on the normal vectors, the change values of the normal vectors of two adjacent points in the first path can be compared. For example, one change value can be represented by the angle formed by the normal vectors of the two points. The larger the angle, the larger the change value of the normal vectors is.

The change values of the normal vectors can be compared with a preset normal vector change threshold. The points whose change values of the normal vectors are smaller than the preset normal vector change threshold and which are the points outside the narrow space are fitted to obtain the first straight path.

Step S204: Determine an intersection of a centerline of the limited space and the first straight path, and determine a second straight path for the robot to move through the limited space according to the centerline and the intersection.

After the first straight path is determined, the first straight path can be extended, so that the extended first straight path intersects the center line of the narrow space that the robot needs to pass through to obtain an intersection. The second straight path can be determined based on the intersection and the center line of the narrow space.

Step S205: Generate a second path for the robot to move through the limited space based on the first straight path and the second straight path, and navigate the robot to move through the limited space according to the second path.

After the first straight path and the second straight path are determined, as shown in FIG. 3, the first straight path can be extended so that the first straight path and the second straight path intersect at T0, thereby generating a continuous second path formed by the first straight path and the second straight path.

In the generated second path (i.e., the dotted line in the figure), both the first straight path and the second straight path are straight paths. When moving along a straight path, the robot only needs to move in a pre-determined pose. Moving in a pose when the width of the cross section taken along a direction that is perpendicular to the forward direction of the robot is the smallest can enable the robot to effectively reduce the probability of collision with obstacles and improve the reliability of the movement of the robot.

In a possible implementation, the obstacles in the map can also be expanded based on the radius of the inscribed circle of the robot, and the expanded map is compared with the second path to determine whether the second path collides with the expanded obstacle. In this way, the reliability of the second path can be dynamically detected during the moving process of the robot.

Figure 8:
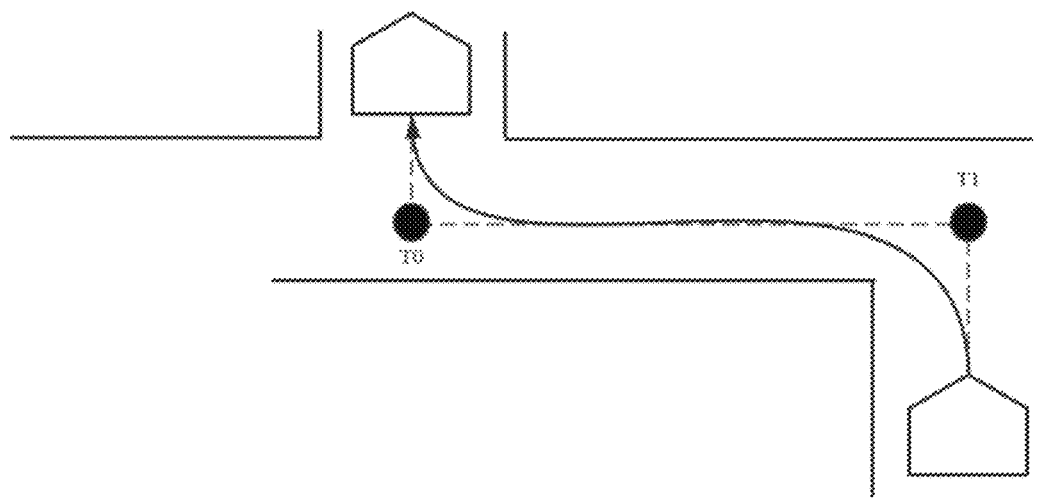
FIG. 8 is a schematic diagram of path optimization for a turning of a passage according to one embodiment.

The narrow space described in the embodiments of the present disclosure includes, but is not limited to, a door, and may also include areas such as a turning of a passage. As shown in FIG. 8, when the robot is about to pass through the turning of a passage, a first path can be generated using the shortest path method. Then, based on the normal vectors and/or curvature of the points on the first path, the points that can be fit to form the first straight path are determined. A second straight-line path can then be determined based on the intersection T1 of the centerline of the passage and the first straight path. A second path for the robot to pass through the turning can be generated based on the first straight path and the second straight path.

It should be understood that sequence numbers of the foregoing processes do not mean an execution sequence in the embodiments of the present disclosure. The execution sequence of the processes should be determined according to functions and internal logic of the processes, and should not be construed as any limitation on the implementation processes of the embodiments of the present disclosure.

FIG. 9 is a schematic block diagram of a navigation device for a robot according to one embodiment. The device may include a first path acquisition unit 801, a calculation unit 802, a first straight path fitting unit 803, a second straight path determination unit 804, and a navigation unit 805. The first path acquisition unit 801 is to obtain a planned first path for the robot to reach a target position. The calculation unit 802 is to calculate curvature and/or normal vectors of points in the first path. The first straight path fitting unit 803 is to, according to the curvature and a preset curvature threshold, and/or according to the normal vectors and a preset normal vector change threshold, obtain a first straight path for the robot outside the limited space by curve fitting. The second straight path determination unit 804 is to determine an intersection of a centerline of the limited space and the first straight path, and determine a second straight path for the robot to move through the limited space according to the centerline and the intersection. The navigation unit 805 is to generate a second path for the robot to move through the limited space based on the first straight path and the second straight path, and navigate the robot to move through the limited space according to the second path.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product the functions may be stored in a computer-readable storage medium. Based on such an understanding, the technical solutions in the present disclosure essentially, or the pan contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for navigating a robot through a limited space, the method comprising:
   obtaining a planned first path for the robot to reach a target position;
   calculating curvature and/or normal vectors of points in the first path;
   according to the curvature and a preset curvature threshold, and/or according to the normal vectors and a preset normal vector change threshold, obtaining a first straight path for the robot outside the limited space by curve fitting;
   determining an intersection of a centerline of the limited space and the first straight path, and determining a second straight path for the robot to move through the limited space according to the centerline and the intersection; and
   generating a second path for the robot to move through the limited space based on the first straight path and the second straight path, and navigating the robot to move through the limited space according to the second path;
   wherein obtaining the first straight path for the robot outside the limited space by curve fitting according to the curvature and a preset curvature threshold, comprises:
      comparing the curvature of each of the points in the first path with the preset curvature threshold, and determining ones of the points in the first path whose curvature is less than the curvature threshold; and
      obtaining the first straight path by performing straight line fitting on points before entering the limited space and whose curvature is less than the curvature threshold; and/or
   wherein obtaining the first straight path for the robot outside the limited space by curve fitting according to the normal vectors and a preset normal vector change threshold, comprises:
      determining normal vector change values according to pairs of two adjacent points in the first path;
      comparing each of the normal vector change values with the preset normal vector change threshold, and determining ones of the normal vector change values smaller than the normal vector change threshold; and
      obtaining the first straight path by performing straight line fitting on points corresponding to the normal vector change values smaller than the normal vector change threshold.

2. The method of claim 1, further comprising, before calculating curvature and/or normal vectors of points in the first path, obtaining a radius of an inscribed circle and a radius of a circumscribed circle of the robot;

performing obstacle expanding for obstacles associated with the limited space according to the radius of the inscribed circle and the radius of the circumscribed circle;

in response to a first expansion result based on the radius of the inscribed circle indicating collision, and a second expansion result based on the radius of the circumscribed circle indicating no collision, determining that a new second path for the robot to move through the limited space needs to be regenerated.

3. The method of claim 1, wherein navigating the robot to move through the limited space according to the second path comprises:

performing obstacle expanding for the limited space according to the radius of the inscribed circle of the robot; and navigating the robot in a map after the obstacle expanding according to the second path.

4. The method of claim 3, wherein navigating the robot in a map after the obstacle expanding according to the second path comprises:

adjusting the robot to be in a desired pose so that the robot has a minimum width measured along a direction that is perpendicular to the second path; and navigating the robot to move in the desired pose according to the second path.

5. The method of claim 1, wherein obtaining the planned first path for the robot to reach the target position comprises:

determining the first path for the robot to reach the target position using a shortest path algorithm.

6. A robot comprising:

one or more processors; and a memory coupled to the one or more processors, the memory storing programs that, when executed, cause the one or more processors to:

obtain a planned first path for a robot to reach a target position;

calculate curvature and/or normal vectors of points in the first path;

according to the curvature and a preset curvature threshold, and/or according to the normal vectors and a preset normal vector change threshold, obtain a first straight path for the robot outside a limited space by curve fitting;

determine an intersection of a centerline of the limited space and the first straight path, and determine a second straight path for the robot to move through the limited space according to the centerline and the intersection; and generate a second path for the robot to move through the limited space based on the first straight path and the second straight path, and navigate the robot to move through the limited space according to the second path;

wherein to obtain the first straight path for the robot outside the limited space by curve fitting according to the curvature and a preset curvature threshold, the programs, when executed, cause the one or more processors to:

compare the curvature of each of the points in the first path with the preset curvature threshold, and determine ones of the points in the first path whose curvature is less than the curvature threshold; and obtain the first straight path by performing straight line fitting on points before entering the limited space and whose curvature is less than the curvature threshold; and/or wherein to obtain the first straight path for the robot outside the limited space by curve fitting according to the normal vectors and a preset normal vector change threshold, the programs, when executed, cause the one or more processors to:

determine normal vector change values according to pairs of two adjacent points in the first path;

compare each of the normal vector change values with the preset normal vector change threshold, and determine ones of the normal vector change values smaller than the normal vector change threshold; and obtain the first straight path by performing straight line fitting on points corresponding to the normal vector change values smaller than the normal vector change threshold.

7. The robot of claim 6, wherein the programs, when executed, cause the one or more processors to, before calculating curvature and/or normal vectors of points in the first path, obtain a radius of an inscribed circle and a radius of a circumscribed circle of the robot;

perform obstacle expanding for obstacles associated with the limited space according to the radius of the inscribed circle and the radius of the circumscribed circle;

in response to a first expansion result based on the radius of the inscribed circle indicating collision, and a second expansion result based on the radius of the circumscribed circle indicating no collision, determine that a new second path for the robot to move through the limited space needs to be regenerated.

8. The robot of claim 6, wherein to navigate the robot to move through the limited space according to the second path, the programs, when executed, cause the one or more processors to:

perform obstacle expanding for the limited space according to the radius of the inscribed circle of the robot; and navigate the robot in a map after the obstacle expanding according to the second path.

9. The robot of claim 8, wherein to navigate the robot in a map after the obstacle expanding according to the second path, the programs, when executed, cause the one or more processors to:

adjust the robot to be in a desired pose so that the robot has a minimum width measured along a direction that is perpendicular to the second path; and navigate the robot to move in the desired pose according to the second path.

10. The robot of claim 6, wherein to obtaining the planned first path for the robot to reach the target position, the programs, when executed, cause the one or more processors to:

determine the first path for the robot to reach the target position using a shortest path algorithm.

11. A non-transitory computer-readable storage medium storing instructions that, when executed by at least one processor, cause the at least one processor to perform a method for navigating a robot through a limited space, the method comprising:

obtaining a planned first path for the robot to reach a target position;

calculating curvature and/or normal vectors of points in the first path;

according to the curvature and a preset curvature threshold, and/or according to the normal vectors and a preset normal vector change threshold, obtaining a first straight path for the robot outside the limited space by curve fitting;

determining an intersection of a centerline of the limited space and the first straight path, and determining a second straight path for the robot to move through the limited space according to the centerline and the intersection; and generating a second path for the robot to move through the limited space based on the first straight path and the second straight path, and navigating the robot to move through the limited space according to the second path;

wherein obtaining the first straight path for the robot outside the limited space by curve fitting according to the curvature and a preset curvature threshold, comprises:

comparing the curvature of each of the points in the first path with the preset curvature threshold, and determining ones of the points in the first path whose curvature is less than the curvature threshold; and obtaining the first straight path by performing straight line fitting on points before entering the limited space and whose curvature is less than the curvature threshold; and/or wherein obtaining the first straight path for the robot outside the limited space by curve fitting according to the normal vectors and a preset normal vector change threshold, comprises:

determining normal vector change values according to pairs of two adjacent points in the first path;

comparing each of the normal vector change values with the preset normal vector change threshold, and determining ones of the normal vector change values smaller than the normal vector change threshold; and obtaining the first straight path by performing straight line fitting on points corresponding to the normal vector change values smaller than the normal vector change threshold.

12. The non-transitory computer-readable storage medium of claim 11, wherein the method further comprises, before calculating curvature and/or normal vectors of points in the first path, obtaining a radius of an inscribed circle and a radius of a circumscribed circle of the robot;

performing obstacle expanding for obstacles associated with the limited space according to the radius of the inscribed circle and the radius of the circumscribed circle;

in response to a first expansion result based on the radius of the inscribed circle indicating collision, and a second expansion result based on the radius of the circumscribed circle indicating no collision, determining that a new second path for the robot to move through the limited space needs to be regenerated.

13. The non-transitory computer-readable storage medium of claim 11, wherein navigating the robot to move through the limited space according to the second path comprises:

performing obstacle expanding for the limited space according to the radius of the inscribed circle of the robot; and navigating the robot in a map after the obstacle expanding according to the second path.

14. The non-transitory computer-readable storage medium of claim 13, wherein navigating the robot in a map after the obstacle expanding according to the second path comprises:

adjusting the robot to be in a desired pose so that the robot has a minimum width measured along a direction that is perpendicular to the second path; and navigating the robot to move in the desired pose according to the second path.

15. The method of claim 1, wherein each of the normal vector change values is represented an angle formed by the normal vectors of the two adjacent points, and wherein larger the angle, larger the normal vector change value is.

16. The method of claim 2, wherein obtaining the radius of the inscribed circle and the radius of the circumscribed circle of the robot comprises:

calculating distance from center of the robot to each side of contour of a robot chassis, and selecting smallest distance in the calculated distance as the radius of the inscribed circle of the robot; and calculating distance from the center of the robot to vertices on the contour of the robot chassis, and selecting largest distance from the center of the robot to one of the vertices on the contour of the robot chassis as the radius of the circumscribed circle of the robot; or wherein obtaining the radius of the inscribed circle and the radius of the circumscribed circle of the robot comprises:

calculating a cross-sectional width of the robot when the robot is in any pose;

using a smallest cross-sectional width as a diameter of the inscribed circle of the robot, and using a largest cross-sectional width as a diameter of the circumscribed circle of the robot; and determining the radius of the inscribed circle and the radius of the circumscribed circle of the robot according to the diameter of the inscribed circle and the diameter of the circumscribed circle of the robot.

17. The method of claim 2, wherein after the obstacle expanding, an expansion area formed based on the radius of the inscribed circle and an expansion area formed based on the radius of the circumscribed circle are obtained, and wherein the radius of the inscribed circle is smaller than the radius of the circumscribed circle, the expansion area formed based on the radius of the circumscribed circle is greater than the expansion area formed based on the radius of the inscribed circle, and the expansion area formed based on the radius of the circumscribed circle includes the expansion area formed based on the radius of the inscribed circle; and wherein the method further comprises:

adjusting the robot to be in a desired pose so that a cross-sectional width of the robot in a forward direction is adjusted to a minimum value, in response to the second expansion result based on the radius of the circumscribed circle indicating no collision, and the limited space being smaller than a preset space.

18. The method of claim 1, wherein calculating the curvature and/or normal vectors of points in the first path comprises:

performing sampling from the first path, and calculating the curvature and/or normal vectors of the sampled points, wherein the sampling is performed according to a rule of equal spacing;

wherein when calculating the curvature and normal vector of each point, adjacent path points in a range that is created by taking a point to be calculated as a center and has a predetermined radius are obtained;

wherein the curvature and the normal vectors of points are calculated based on the determined adjacent path points by following calculation equation:

$$r = r2/(r1 + r2); v = \begin{bmatrix} U(0,1) \\ U(1,1) \end{bmatrix},$$

where r represents the curvature, v represents the normal vectors, r1 and r2 satisfy $$U, \begin{bmatrix} r1 & 0 \\ 0 & r2 \end{bmatrix}, U^T = svd(A), A = \frac{1}{|\text{neighbors}|} \sum_{p_i \in neighbors} (p_i - \bar{p})^T (p_i - \bar{p}),$$

$$\text{and } \bar{p} = \frac{1}{|\text{neighbors}|} \sum_{p_i \in neighbors} p_i,$$

pi represents any adjacent path point, U represents an orthogonal matrix obtained by singular value decomposition, A represents a 2*2 matrix calculated by a formula, and p represents a mean value of all adjacent points.

19. The method of claim 1, wherein obtaining the first straight path by performing straight line fitting on points before entering the limited space and whose curvature is less than the curvature threshold comprises:
   selecting a partial path of the first path; and
   obtaining the first straight path by performing straight line fitting on points in the selected partial path that are located outside the limited space and whose curvature is smaller than the preset curvature threshold.

20. The method of claim 1, wherein the limited space comprises a door and a turning of a passage.

* * * * *